United States Patent [19]

Mitchell

[11] Patent Number: 4,787,451

[45] Date of Patent: Nov. 29, 1988

[54] MELAMINE/FORMALDEHYDE CROSS-LINKING OF POLYMERS FOR PROFILE CONTROL

[75] Inventor: Thomas O. Mitchell, Pennington, N.J.

[73] Assignee: Mobil Oil Corporation, New York, N.Y.

[21] Appl. No.: 940,682

[22] Filed: Dec. 11, 1986

[51] Int. Cl.$^4$ .................... E21B 33/138; E21B 43/16; E21B 43/20

[52] U.S. Cl. .................... 166/270; 166/274; 166/295; 523/130

[58] Field of Search .............. 166/270, 273, 275, 295, 166/300; 252/8.554; 405/264; 523/130

[56] References Cited

U.S. PATENT DOCUMENTS

| | | |
|---|---|---|
| 3,334,689 | 8/1967 | McLaughlin .................... 166/295 |
| 3,908,760 | 9/1975 | Clampitt et al. ................. 166/246 |
| 3,918,521 | 11/1975 | Shavely, Jr. et al. ............. 166/272 |
| 4,157,322 | 6/1979 | Colegrove .................... 166/270 X |
| 4,461,351 | 7/1984 | Falk ............................. 166/295 |
| 4,479,894 | 10/1984 | Chen et al. .................... 252/8.554 |
| 4,485,020 | 11/1984 | Shay et al. .................... 252/8.55 D |
| 4,489,783 | 12/1984 | Shu ............................. 166/272 |
| 4,513,821 | 4/1985 | Shu ............................. 166/273 |
| 4,548,268 | 10/1985 | Stipanovic .................... 166/270 |
| 4,565,249 | 1/1986 | Pebdani et al. ................ 166/303 |
| 4,579,667 | 4/1986 | Ect et al. .................... 523/130 X |
| 4,590,228 | 5/1986 | Soreau et al. ................ 166/295 X |
| 4,613,631 | 9/1986 | Espenscheid et al. ........... 523/130 |
| 4,658,898 | 4/1987 | Paul et al. .................... 166/295 X |
| 4,673,038 | 6/1987 | Sandiford et al. ............. 166/270 |

OTHER PUBLICATIONS

Hawley, Gessner G., *The Condensed Chemical Dictionary*, Eighth Edition, 1971, pp. 912.

*Primary Examiner*—George A. Suchfield
*Attorney, Agent, or Firm*—Alexander J. McKillop; Michael G. Gilman; Charles A. Malone

[57] ABSTRACT

An improved process for forming improved gels where biopolymers and synthetic polymers are cross-linked with melamine/formaldehyde and other amino resins at an optimal range of ratios of amine to aldehyde in the amino resins. This optimal range of ratios can vary from about 1:6 to about 1:30 amine to aldehyde. Resins utilized in said optimal range are most effective for producing improved firm, stable gels. The resultant gels are useful in waterflooding and carbon dioxide flooding operations during the recovery of hydrocarboneaceous fluids.

16 Claims, No Drawings

MELAMINE/FORMALDEHYDE CROSS-LINKING OF POLYMERS FOR PROFILE CONTROL

FIELD OF THE INVENTION

This information relates to improved novel gels resultant from melamine formaldehyde and other amino resins as general gelants for polymers containing hydroxyl, amino, amide and thiol functionalities. Resultant gels are useful as profile control agents during water flooding or carbon dioxide flooding in a hydrocarbon bearing reservoir.

BACKGROUND OF THE INVENTION

In all secondary and tertiary enhanced oil recovery processes in which a drive fluid is used to force oil from an injection well to a production well, profile control may be needed to overcome the deleterious effects of formation permeability stratification. When formation permeability inhomogeneity is encountered, injected and driven fluids preferably travel through the most permeable regions, resulting in low sweep efficiency and bypassing of oil in lower permeability regions.

Another problem encountered is that of gravity override. This occurs when injected fluids much lighter than the reservoir fluids separate by gravity, rising toward the top of the flowing region which results in bypassing of lower regions. One commonly employed solution to these problems is to inject a material that will preferentially flow into the more permeable regions (or is selectively introduced into higher regions) but will subsequently impede further flow through them, thus diverting flowing fluids into previously uninvaded regions. Polymer gels, or polymer/gelling agent mixtures that will subsequently gel in situ have been used.

The enhanced oil recovery techniques of waterflooding, carbon dioxide flooding, miscible or immiscible gas flooding and steam flooding are of particular interest and importance. Profile control can often improve performance in such processes by reducing the effects of permeability stratification or gravity override. A gel suitable for profile control must form and be stable enough to continue to impede flow for long periods of time at the reservoir temperature, salinity and pH. A variety of materials are commercially available for profile control, all of which perform differently and have limitations. Biopolymers such as xanthan gums are unstable above about 140° F. Synthetic polyacrylamides, depending upon their degree of hydrolysis and the nature and amount of other functional groups such as alkyl sulfonate or pyrrolidone, will have a temperature above which they will not be useful at a given salinity. Depending upon the specific conditions in a reservoir, one or more of these will be favored on the basis of cost-performance considerations.

Metal-complexed polymer gels are widely used for profile control. For example, Al (III) and Cr (III) are used to cross-link polyacrylamide. Other metal ions, such as Ti (IV), Zr (IV), Fe (III), etc., are also useful as gelants for polymers.

Several limitations may interfere with the use of metal ions in the preparation of gels for profile control. One limitation is that each metal is reactive only to certain functionalities. For example, Al, Cr and Zr are reactive to amide and carboxyl groups, while Ti is reactive to hydroxyl groups. A proper match of the polymer with the appropriate metal cross-linker must be considered. There is no presently known general metal cross-linker for all polymer types. Carbonate, biocarbonate and sulfate anions are known to interfere with the gelation of Cr, Zr and Al. Another limitation is that pH control is important for most metal cross-linking reactions. It is easy to control the pH when the gel is prepared above surface but difficult to do when an in-situ gelation processed is used. Furthermore, ligand-metal bond formation and stability may be affected by high ionic strength and the temperature of reservoir brine. At substantially high brine concentrations and high temperatures metal-ligand bonds can dissociate due to unfavorable equilibria.

Therefore, what is needed is an optimal range of economical amino resins which will co-gel and cross-link covalently with all polymers known to be useful to profile control where said polymers contain amine, amide, hydroxyl or thiol functionalities, thereby forming more stable gels. The utilized gelation reaction should proceed under all pH conditions; should not require an acid or base to catalyze; and should not be affected by reservoir brine. The resultant linkages should be stable at substantially high temperatures and high salinities.

SUMMARY OF THE INVENTION

This invention is directed to a composition of matter comprising water, a cross-linkable polymer and an aminoplast resin containing methylol groups which cross-link with said polymer. Said polymer is in said composition in about 0.2 to about 5.0 wt. percent and has at least one functional group selected from a member of the group consisting of an amine, an amide, a hydroxyl or a thiol group.

The aminoplast resin is in the composition in an amount of from about 0.10 to about 5.0 wt. percent. Said resin contains methylol groups and may be alkylated partially and cross-links with said polymer.

The amine and aldehyde are contained in the composition of said resin in a critical mole ratio. This critical mole ratio is about 1:6 to about 1:30 of said amine to said aldehyde. The resultant composition forms a substantially improved stable gel which is sufficient for use in a subterranean reservoir during the recovery of hydrocarbonaceous fluids therefrom. Said gel is particularly useful in producing hydrocarbonaceous fluids from a reservoir and greatly improves the sweep efficiency of driving fluids. Sweep efficiencies are also improved in water flood, steam flood and miscible carbon dioxide flood processes.

It is therefore an object of this invention to provide for economical aminoplast resins which will co-gel and cross-link with all polymers useful for profile control.

It is another object of this invention to provide a gelation reaction which can proceed under substantially all pH conditions encountered in a hydrocarbonaceous reservoir.

It is a yet further object of this invention to provide for a substantially more stable gel when high temperatures are encountered in a reservoir.

It is a still yet further object of this invention to provide for a gelation reaction which will proceed in a saline hydrocarbonaceous reservoir environment.

It is an even yet further object of this invention to provide for a gelation reaction which allows for partial substitution of less expensive formaldehyde for more expensive melamine and polymer.

DESCRIPTION OF THE PREFERRED EMBODIMENTS

In the practice of this invention, a melamine formaldehyde ("MF") resin is formed as a reaction product of melamine and formaldehyde. Said resin is known as an aminoplast or amino resin which comprises a class of thermo-setting resins made by the reaction of an amine with an aldehyde. The resin may be partially alkylated. The resultant resin is reacted with a cross-linkable polymer in an aqueous medium under all pH conditions and needs no catalyst. Said polymer has at least one functional group selected from a member of the group consisting of an amine, an amide, a hydroxyl, or a thiol group. This reaction can be carried out at ambient conditions, and also under conditions occurring in a subterranean hydrocarbonaceous formation. The gel resultant from said reaction can be used in the recovery of hydrocarbonaceous fluids from a formation containing same.

These gels are novel in that they are unaffected by high saline concentrations often encountered in oil reservoirs. High temperatures encountered in said reservoirs do not adversely affect said gels. Carbonate, bicarbonate, and sulfate anions encountered in oil reservoirs which are known to affect certain metal cross-linked gels do not affect these novel gels. These novel gels can be formed under all pH conditions and are particularly useful in pH conditions of 10 or less. A method for making a kindred gel is discussed in U.S. Pat. No. 4,157,322 which issued to Colegrove on June 5, 1979. Unlike Colegrove, the instant gelation reaction is not catalyzed by a salt which is acid generating upon the application of heat. This patent is hereby incorporated by reference.

Polymers having functional groups such as $NH_2$, $-CONH_2$, $-OH$, $-SH$ can be gelled with amino resins. Some acceptable polymers include polyacrylamide, Kelco's S-130 bipolymer, acrylamide modified polyvinyl alcohol ("AMPVA"), xanthan biopolymers, poly(acrylamide-co-acryl-amido-2-methyl-propanesulfonate) "AM-AMPS", "Phillips HE" polymers (a family of acrylamide containing copolymers), and polyvinyl alcohol. Polymers mentioned in U.S. Pat. No. 4,157,322, supra, may be utilized as long as those polymers contain the functional groups above mentioned. Polymer concentration in said gels range from about 0.1 to about 5.0 wt. percent. These polymer concentrations vary depending upon the molecular weight of polymer used. Lower molecular weight polymers require a higher polymer concentration to gel. A polymer concentration of about 0.2–5.0 wt. percent is preferred. This cross-linking/co-gelation method produces high integrity polymer gels able to withstand high temperatures and high salinity conditions often found in subterranean hydrocarbonaceous formations and low pH conditions found in $CO_2$-flooded reservoirs.

MF resin derived as a reaction product of melamine and formaldehyde has an amine/aldehyde molar ratio of between 1-6. A ratio of 3-6 is commonly found in commercial resins. The methylol group, $-CH_2OH$, is reactive to various functional groups such as $NH_2$, $-CONH_2$, $-OH$, $-SH$ and can also self-condense to form cured resins. Its preparation is convenient and well documented in preparative polymer manuals.

The melamine resin that is utilized in this invention can be a commercial product such as Cyanamid's Parez ® resins with the critical amine to aldehyde molar ratio increased by addition of aldehyde if necessary. Included among these melamine-formaldehyde (melamine) resins which are useful in this invention are the partially methylated resins and the hexamethoxymethyl resins (i.e., American Cyanamid's Parez, Cymel ™ 373, Cymel 370, Cymel 303, and Cymel 380). The resin, however, has to be one that is soluble or dispersible in an aqueous medium. Other amino resins can also be used. Non-limiting examples are urea-formaldehyde, ethylene and propylene urea formaldehyde, and triazone, uron, and glyoxal amino resins. The amount of amine and aldehyde in the resins required for adequate gel formation is in the molar ratio of 1:6–1:30 amine to aldehyde. Preferred polymer concentrations are from about 0.2 to about 5.0 wt. percent. Amino resins are preferred crosslinkers because they (1) are economical to use; (2) can be applied to a wide variety of polymers; (3) form thermally stable, brine tolerant gels stable at low pH; and (4) do not need an acid or base catalyst.

The data which follow indicate the extent of the unexpectedly good results obtained when resins having the critical ratios of melamine and formaldehyde are utilized. Table 1 shows the results obtained when gels are formed outside the critical rations disclosed in this invention.

Table 1 shows gels prepared using varying concentrations of Kelco's microbial polysaccharide S-130 in several brines and indicated amounts of Parez 613 (a commercial resin made from melamine/formaldehyde in the ratio 1:3). The mixtures were adjusted to pH 3.5 with HCl to simulate $CO_2$-flooding conditions and stored at the indicated temperatures.

TABLE I

| | | $CO_2$ Profile Control Gels (pH 3.5) | | | | |
|---|---|---|---|---|---|---|
| ppm S-130 | ppm Parez | ppm HCHO | deg F. | SAL (1) | weeks | gel |
| 2500 | 2000 | 0 | 175 | 12 | 10 | very loose |
| 5000 | 1000 | 0 | 140 | 6 | 3 | breaking |
| 5000 | 1000 | 0 | 140 | 12 | 18 | very loose |
| 5000 | 1000 | 0 | 175 | 6 | 1 | loose & broken |
| 5000 | 1000 | 0 | 175 | 12 | 2 | loose & broken |
| 5000 | 2000 | 0 | 140 | 6 | 13 | loose & broken |
| 5000 | 2000 | 0 | 140 | 12 | 17 | firm (2) |
| 5000 | 2000 | 0 | 175 | 6 | 2 | loose & broken |
| 5000 | 2000 | 0 | 175 | 12 | 3 | loose & broken |

(1) Salinity, weight per cent.
(2) 20% syneresis; all others no syneresis.

Table II shows the results obtained when the critical ratios of amine and aldehyde are used. In these examples the ratios were adjusted by addition of formaldehyde to Parez. This technique of adding additional aldehyde to commercial resin is a method of practicing the invention. Utilization of said critical ratios unexpectedly results in gels which are substantially more stable at higher temperatures for greater periods of time. Concentrations of polymer and resin were similar to those utilized in Table 1. Conditions similar to those used in Table 1 were utilized in Table 11.

TABLE II

| CO₂ Profile Control Gels (pH 3.5) | | | | | | |
|---|---|---|---|---|---|---|
| ppm S-130 | ppm Parez | ppm HCHO | deg F. | SAL (1) | weeks | gel |
| 2500 | 2000 | 750–3000 | 140 | 6 | 10 | firm (3) |
| 3500 | 2000 | 1000–2000 | 140 | 6 | 7 | firm (3) |
| 3500 | 2000 | 1000–2000 | 175 | 6 | 7 | firm (3) |
| 3500 | 3000 | 3000 | 140 | 6 | 5 | firm (3) |
| 3500 | 3000 | 3000 | 175 | 6 | 5 | firm (3) |

(1) Salinity, weight per cent.
(3) No syneresis.

Table III shows similar experiments with a xanthan gum, Pfizer's Flocon 4800. The improvement afforded by proper adjustment of the melamine:formaldehyde within the critical ratio is again evident. In another example with 3500 ppm Flocon 4800 polymer, gels made with 3000 ppm Parez 613 and 3000 ppm formaldehyde in 12% brine were adjusted to pH 5. These gels have been firm and stable with no syneresis at both 140° and 175° F. for 8 weeks. In additional examples, gels made at pH 3.5 from 3500 ppm Flocon 4800, 1000 ppm Parez 613, 1000–2000 ppm formaldehyde, and 45 ppm Cr (III) have been firm and stable at 140° F. for 8 weeks, and at 175° F. they show only a trace of syneresis after 8 weeks.

TABLE III

| CO₂ Profile Control Gels (pH 3.5) Each 3500 ppm Flocon; 12% Brine | | | | |
|---|---|---|---|---|
| ppm Parez | ppm HCHO | deg F. | weeks | gel |
| 1850 | 0 | 140 | 8 | loose; 5% syneresis |
| 1850 | 0 | 175 | 3 | broken up |
| 1850 | 1500 | 140 | 16 | firm |
| 1850 | 1500 | 175 | 16 | loose |
| 1850 | 4500 | 140 | 8 | 20% syneresis |
| 1850 | 4500 | 175 | 13 | loose; trace syneresis |
| 1000 | 1000 | 140 | 6 | firm |
| 1000 | 1000 | 175 | 5 | very loose |
| 1000 | 2000 | 140 | 6 | firm |
| 1000 | 2000 | 175 | 5 | very loose |

It is also clear from the above examples that use of said critical amine:aldehyde mole ratio provides an important economic advantage in substituting inexpensive aldehyde for expensive amine and/or polymer.

Where it is desired to obtain increased sweep efficiency, gels of this invention can be used to plug a previously swept portion of a formation. Said gels can be directed to areas of increased porosity by utilization in any of the below methods.

One method where gels of this invention can be utilized is during a waterflooding process for the recovery of oil from a subterranean formation. After plugging the more permeable zones of a reservoir with the novel gels of this invention, a waterflooding process can be resumed or commenced. U.S. Pat. No. 4,479,894, issued to Chen et al., describes one such waterflooding process. This patent is hereby incorporated by reference in its entirety.

Steamflood processes which can be utilized when employing the gels described herein are detailed in U.S. Pat. Nos. 4,489,783 and 3,918,521 issued to Shu and Snavely, respectively. These patents are hereby incorporated by reference herein.

Gels described herein can also be used in conjunction with a cyclic carbon dioxide steam stimulation in a heavy oil recovery process to obtain greater sweep efficiency. Cyclic carbon dioxide steam stimulation can be commenced or resumed after plugging the more permeable zones of the reservoir with the novel gels of this invention. A suitable process is described in U.S. Pat. No. 4,565,249 which issued to Pebdani et al. This patent is hereby incorporated by reference in its entirety. Increased sweep efficiency can be obtained when the subject gels are used in combination with a carbon dioxide process for recovering oil. Prior to commencement or resumption of the carbon dioxide process, the more permeable zones are plugged with these novel gels.

Although the present invention has been described with preferred embodiments, it is to be understood that modifications and variations may be resorted to without departing from the spirit and scope of this invention, and those skilled in the art will readily understand. Such modifications and variations are considered to be within the purview and scope of the appended claims.

What is claimed is:

1. A process for closing pores in a more permeable zone of a hydrocarbonaceous fluid bearing formation to obtain improved sweep efficiency prior to a waterflood oil recovery operation wherein the process comprises injecting into the formation a gelable composition comprising:
   (a) water;
   (b) 0.2 to 5.0 wt. percent of a cross-linkable polymer having at least one functional group selected from a member of the group consisting of an amine, an amide, a hydroxyl, or a thiol group; and
   (c) 0.1 to 5.0 wt. percent of a methylol containing aminoplast resin which cross links with said polymer, thereby forming a gel of a size and strength sufficient to close pores in one or more permeable zones of said formation, said resin having amine and aldehyde in a critical mole ratio of from about 1:6 to about 1:30 respectively, which ratios are sufficient to form substantially improved stable gels for utilization in a subterranean formation during the recovery of hydrocarbonaceous fluids.

2. The process as recited in claim 1 wherein said resin is a member selected from the group consisting of melamine-formaldehyde, urea formaldehyde, ethylene urea formaldehyde, propylene urea formaldehyde, and triazone, uron, and glyoxal amino resins.

3. The process as recited in claim 1 wherein said polymer is a member selected from the group consisting of polyacrylamide, polyvinyl alcohol, xanthan biopolymers, Kelco S-130 biolpolymer, sodium aliginate biopolymers, poly (acrylamide-co-acrylamido-2-methylpropanesulfonate), Phillips HE polymers, and acrylamide modified polyvinyl alcohol.

4. The process as recited in claim 1 wherein said gel is formed under salinity concentrations encountered in an oil reservoir.

5. The process as recited in claim 1 wherein said gel is of a stability sufficient to withstand high temperatures encountered in an oil reservoir for periods greater than three months.

6. The process as recited in claim 1 wherein said gel is unaffected by carbonate, bicarbonate, and sulfate anions encountered in an oil reservoir.

7. The process as recited in claim 1 wherein said resin can condense to form a cured resin.

8. The process as recited in claim 1 wherein a gelation reaction which produces said gel proceeds under substantially all pH conditions.

9. A process for closing pores in a more permeable zone of a hydrocarbonaceous fluid bearing formation to obtain improved sweep efficiency prior to a cabon dioxide oil recovery operation wherein the process comprises injecting into the formation a gelable composition comprising:
   (a) water;
   (b) 0.2 to 5.0 wt. percent of a cross-linkable polymer having at least one functional group selected from a member of the group consisting of an amine, an amide, a hydroxyl, or a thiol group; and
   (c) 0.1 to 5.0 wt. percent of a methylol containing aminoplast resin which cross-links with said polymer thereby forming a gel of a size and strength sufficient to close pores in one or more permeable zones of said formation, said resin having amine and aldehyde in a critical mole ratio of from about 1:6 to about 1:30 respectively, which ratios are sufficient to form substantially improved stable gels for utilization in a subterranean formation during the recovery of hydrocarbonaceous fluids.

10. The process as recited in claim 9 wherein said resin is a member selected from the group consisting of melamine-formaldehyde, urea formaldehyde, ethylene urea formaldehyde, propylene urea formaldehyde, and triazone, uron, and glyoxal amino resins.

11. The process as recited in claim 9 wherein said polymer is a member selected from the group consisting of polyacrylamid, polyvinyl alcohol, xanthan biopolymers, Kelco S-130 biopolymers, poly (acrylamideco-acrylamido-2-methyl-propanesulfonate), Phillips HE polymers, and acrylamide modified polyvinyl alcohol.

12. The process as recited in claim 9 wherein said gel is formed under salinity concentrations encountered in an oil reservoir.

13. The process as recited in claim 9 wherein said gel is of a stability sufficient to withstand high temperatures encountered in an oil reservoir for periods greater than three months.

14. The process as recited in claim 9 wherein said resin can condense to form a cured resin.

15. The process as recited in claim 9 wherein a gelation reaction which produces said gel proceeds under substantially all pH conditions.

16. The process as recited in claim 9 wherein said gel is unaffected by carbonate, bicarbonate, and sulfate anions encountered in an oil reservoir.

* * * * *